United States Patent
Tsubouchi (12)

(10) Patent No.: US 6,427,933 B1
(45) Date of Patent: Aug. 6, 2002

(54) METHOD FOR MANUFACTURING CRYSTALLINE SUPERFINE SILK POWDER

(75) Inventor: Kozo Tsubouchi, Ibaraki (JP)

(73) Assignees: Japan as represented by Director General of National Institute of Sericultural and Entomological Science Ministry of Agriculture, Forestry and Fisheries; National Institute of Agrobiological Sciences, both of Tsukuba (JP)

( * ) Notice: Subject to any disclaimer, the term of this patent is extended or adjusted under 35 U.S.C. 154(b) by 0 days.

(21) Appl. No.: 09/509,616

(22) PCT Filed: Dec. 21, 1999

(86) PCT No.: PCT/JP99/07197

§ 371 (c)(1),
(2), (4) Date: Mar. 28, 2000

(87) PCT Pub. No.: WO00/75219

PCT Pub. Date: Dec. 14, 2000

(30) Foreign Application Priority Data

Jun. 3, 1999 (JP) .......................................... 11-157178
Sep. 13, 1999 (JP) .......................................... 11-259149

(51) Int. Cl.[7] ........................ A61K 7/021; A61K 7/035
(52) U.S. Cl. ............................. 241/29; 241/21; 241/25
(58) Field of Search ............................... 241/29, 21, 25

(56) References Cited

U.S. PATENT DOCUMENTS 4,233,212 A * 11/1980 Otoi et al. ................ 260/123.7
5,718,954 A * 2/1998 Sano et al. ................ 428/35.6
5,853,764 A * 12/1998 Tsubouchi ................. 424/499

* cited by examiner

Primary Examiner—Allen Ostrager
Assistant Examiner—William Hong
(74) Attorney, Agent, or Firm—Flynn, Thiel, Boutell & Tanis, P.C.

(57) ABSTRACT

The main theme of the invention is to provide a method for manufacturing industrially, by mechanically comminuting silk yarn, crystalline silk fibroin powder below 3 $\mu$m in an average particle diameter, which can be used for various applications. A silk substance such as cocoon filament, silk yarn, or raw silk is brought into an alkali aqueous solution under a pressure of 1 through 5 atmospheric pressure at temperatures from 100° C. through 150° C. to reduce the tensile strength of the silk substance to around 0.02 g/d or less. Thereafter, the resultant silk substance is subjected to dealkalization and drying. Subsequently, the resultant dried silk substance is comminuted into powder below 3 $\mu$m in an average particle diameter. Thus, the crystalline silk fibroin powder below 3 $\mu$m in an average particle diameter is manufactured.

5 Claims, 5 Drawing Sheets

```
Silk substance after alkali treatment, neutralization,
washing in water, and drying
```
↓
```
1. Mill (Frictional comminution)
```
↓
```
2.    Rotary impact pulverizer
```
↓
```
3. Mill (Frictional comminution)
```
↓
```
4.    Air-jet pulverizer
```
↓
```
5.   Classification of particles
```
↓
```
Superfine silk powder
```

FIG. 3

```
Silk substance after alkali treatment, neutralization,
washing in water, and drying
                        ↓
            1. Mill (Frictional comminution)
                        ↓
            2.  Rotary impact pulverizer
                        ↓
            3.  Air-jet pulverizer
                        ↓
                 Superfine silk powder
```

F I G. 4

| Silk substance after alkali treatment, neutralization, washing in water, and drying |

↓

| 1. Rotary impact pulverizer |

↓

| 2.    Air-jet pulverizer |

↓

| fine silk powder |

FIG. 5

Rupture test for supported beam made from silk power

METHOD FOR MANUFACTURING CRYSTALLINE SUPERFINE SILK POWDER

TECHNICAL FIELD

The present invention relates to a method for manufacturing silk fibroin powder below 3 μm in an average particle diameter from silk substances.

BACKGROUND ART

Silk powder is used as an additive for food, beverages, cosmetics, and paints. Conventionally known methods for manufacturing silk powder, particularly, crystalline silk fibroin powder, include:
1) a mechanical method for comminuting silk yarn into powder, and 2) a chemical method in which, for example, a silk substance is dissolved in an aqueous solution containing an acid or neutral salt or the like; thereafter salt produced by neutralization is removed to form a fibroin aqueous solution; a precipitant is added into this aqueous solution to allow silk fibroin to be precipitated; and then this precipitate is dried by separation or the aforementioned aqueous solution is dried by freezing or by spraying.

As an example of powdering according to the aforementioned mechanical method, an example for obtaining 300-mesh silk powder (approximately 30 through 50 μm in an average particle diameter) for use in cosmetics (Japanese Patent Publication No. Sho 27-3650) has been formerly reported and an example of obtaining silk fibroin superfine powder 3.25 μm in an average particle diameter for use in paints (Japanese Laid-Open Patent Publication No. Hei 6-339924) has been reported.

However, the chemical method produces powder of a low crystalline level and thus is not available for producing crystalline silk fibroin powder having a property intrinsically provided in silk.

Silk substances have a property in that moisture absorbency and water absorbency increase as crystallinity becomes lower, so that silk absorbs moisture or water to become softened and easily transformed.

If silk powder having such low crystallinity is dried after absorption of moisture or water, the powder tightly coagulates to form very hard lumps and thus provides no value for use. Therefore, in order to hold the property intrinsically provided in silk, the powder is required to be a crystalline powder in which the structure intrinsically provided in silk yarn remains. Therefore, it can be said that the mechanical comminuting method is desirably employed as an industrial manufacturing method of crystalline powder. On the other hand, as described above, the prior art is limited to obtaining powder approximately 3 μm in an average particle diameter even by the mechanical comminuting method.

That is, various types of mechanical pulverizers provide a limited size of particles by comminuting depending on the property of a raw material to be pulverized so long as the same type of pulverizers are used, whereby powder with a limitlessly small particle diameter cannot be obtained.

In general, pulverizers employing a higher impact speed provide powder having a smaller diameter, however, smaller powder diameters provide lower probability of collision of particles. This provides lower probability for particles to be applied with stress beyond the fracture speed, so that the energy efficiency of the pulverizer decreases acceleratedly with the diameter of particles equal to or less than a specific value.

Therefore, approximately 3 μm is thought to be the limit in an average particle diameter provided by means of the prior art method for obtaining fine powder by comminuting silk yarn.

Concerning the application of silk substances, the present inventors formerly made it clear that silk substances match skin whereby the powder thereof is useful as an epidermal cell growth activating raw material (Japanese Patent Application No. Hei 9-333560). In addition, the fine powder of silk substances has also been expected to be useful as a raw material filler, a coating material, a raw material for cosmetics, etc. The present inventors formerly developed a method for obtaining crystalline silk fibroin powder 3 through 6 μm in an average particle diameter by deteriorating a silk substance in strength through the exposure thereof to an aqueous solution of an alkali meal compound under atmospheric pressure at temperatures of 95° C. or higher, and thereafter by performing dealkalization and drying of the resultant silk substance, and then by comminuting (U.S. Pat. No. 2,615,440). Thereafter, intensive research lead us to a result in that crystalline silk fibroin powder, the powder being a superfine powder below 3 μm in an average particle diameter with the structure intrinsically provided in silk, exerts a property unique thereto so as to be useful for various applications.

That is, such findings have been obtained in that the crystalline silk fibroin powder which is a superfine powder below 3 μm in an average particle diameter provides excellent formability, improved adhesive property to the skin or the like, improved extensibility, and an improved sense of touch and the like, and is outstandingly suitable for applications to raw materials for use in cosmetics such as lip sticks, eyebrow paints, hair dyes, eyeliners, powder blushes, and foundations, and for applications to ink additives, resin composite raw materials, and raw materials for paints.

The present invention has been developed in view of the technical background mentioned above. Its object is to provide a method for manufacturing industrially, by mechanically comminuting silk yarn, crystalline silk fibroin powder below 3 μm in an average particle diameter, which can be used for each of the aforementioned applications.

DISCLOSURE OF INVENTION

In order to achieve the aforementioned object, the present invention employs technical items as shown below. That is, the present invention lies in (1) a method for manufacturing crystalline silk fibroin powder, in which the structure of silk yarn remains, below 3 μm in an average particle diameter, which is obtained by bringing a silk substance such as cocoon filaments, silk yarn, and raw silk into contact with an alkali aqueous solution under a pressure above 1 atmospheric pressure to reduce the strength of the silk substance, then by dealkalizing and drying the silk substance after that, and by comminuting the resultant silk substance thereafter.

Furthermore, the present invention lies in (2) a method for manufacturing crystalline silk fibroin powder below 3 μm in an average particle diameter by bringing a silk substance such as cocoon filaments, silk yarn, and raw silk into contact with an alkali aqueous solution under a pressure of 1 through 5 atmospheric pressure at a temperature of 100° C. through 150° C. to reduce the tensile strength of the silk substance to around 0.02 g/d or less, then dealkalizing and drying the resultant silk substance after that, and by comminuting the dried resultant silk substance thereafter.

Still furthermore, the present invention lies in (3) the method for manufacturing crystalline silk fibroin powder below 3 μm in an average particle diameter according to the aforementioned (2) in which alkalinity of said alkali aqueous solution is pH 9 through pH 12.5.

Still furthermore, the present invention lies in (4) the method for manufacturing crystalline silk fibroin powder below 3 μm in an average particle diameter according to the aforementioned (2) in which impact and frictional comminution are combined in order to comminute said dried silk substance.

Still furthermore, the present invention lies in (5) the method for manufacturing crystalline silk fibroin powder below 3 μm in an average particle diameter according to the aforementioned (2) in which impact and frictional comminution are combined in order to comminute said dried silk substance whereby particle sizes are classified.

Still furthermore, the present invention lies in (6) the method for manufacturing crystalline silk fibroin powder below 3 μm in an average particle diameter according to the aforementioned (4) in which in order to perform comminution by combining impact and frictional comminutions; impact comminution—frictional comminution, frictional-comminution—impact comminution, or frictional comminution—impact comminution—frictional comminution is performed first in sequence to produce silk powder 4 through 15 μm in an average particle diameter, and then impact comminution is performed to produce superfine powder below 3 μm in an average particle diameter.

The present invention may be employed, so long as it follows the objects described in the specification, in a configuration with a combination of two or more selected from the group consisting of the aforementioned 1, 3, 4, 5, and 6, or in a configuration with a combination of two or more selected from the group consisting of the aforementioned 2, 3, 4, 5, and 6.

According to the present invention, in order to obtain crystalline silk fibroin powder below 3 μm in an average particle diameter, the following configuration is employed. That is,
1) a raw material of a silk substance such as cocoon filaments, silk yarn, and raw silk
2) an alkali aqueous solution is brought into contact
3) a temperature of 100° C. through 150° C.
4) under a pressure of 1 through 5 atmospheric pressure
5) a configuration that reduces the tensile strength of the silk substance to around 0.02 g/d or less,
6) thereafter, the resultant silk substance is dealkalized and dried, and
7) then, the dried resultant silk substance is comminuted.

Thus, the above configuration provides crystalline silk fibroin powder below 3 μm in an average particle diameter. In the present invention, it is important to treat the silk substance so that the tensile strength thereof is reduced to around 0.02 g/d or less. It is difficult to obtain powder below 3 μm in an average particle diameter with a tensile strength above 0.02 g/d.

Moreover, it is important to treat the silk substance at a temperature of 100° C. through 150° C. and under a pressure so as to provide uniform degradation in strength.

Moreover, it is desirable to employ, in the comminuting process, a multi-stage comminuting method with two stages or more in which the impact comminution and frictional comminution are combined together.

The silk substance for use in the present invention includes cocoon filaments, raw silk, silk yarn (yarn from which sericin is excluded by degumming), and leftover lint thereof.

Moreover, the silk substance can be applied to woven fabrics, knit fabrics, non-woven fabrics, net yarn, and the like, which are formed of these respective yarns.

In order to implement the present invention, the silk substance is first treated by being brought into contact with an alkali aqueous solution at a temperature above 100° C. preferably, at a temperature within a range of 120° C.±10° C. under a pressure.

As an alkaline substance in the alkaline aqueous solution, sodium carbonate, sodium hydrogen-carbonate, potassium carbonate, sodium hydroxide, potassium hydroxide may be used individually or mixed for use.

The degree of the alkaline aqueous solution (alkalinity) is a pH of 9 through 12.5, preferably, a pH of 10.5 through 12.0.

With a pH less than 9, the strength cannot be reduced uniformly with efficiency, while with a pH above 12.5, an excessive dissolved portion of the silk yarn or the like reduces the rate of collection.

Sodium carbonate, an alkaline substance, has a buffering action as an aqueous solution and is very useful since an increase in concentration hardly causes it to increase the pH thereof to more than around 12.5.

In addition, a slight mixture amount of sodium hydroxide into sodium carbonate may cause the total amount of the alkaline substance used to decrease.

The silk substance in the alkali aqueous solution is treated by soaking the silk substance in the alkaline aqueous solution of a temperature above 100° C.

The time for the silk substance to be in contact with the alkaline aqueous solution (Alkali treatment time) is the time necessary to allow the strength of the silk substance to decrease to a degree suitable for forming superfine powder regardless of whether Bombyx mori silk or wild silks. (*Philosamia cynthia ricini, Antheraea yamamai, Antheraea pernyi, Antheraea mylitta* and so on.)

For example, a silk substance is kept in contact with the alkaline aqueous solution until the tensile strength thereof becomes around 0. 02 g/d or less and more preferably, up to such an extent that the strength of the silk yarn is substantially immeasurable in the tensile test (0.01 g/d or less), that is, until the silk yarn loses the form thereof available for measurement.

In general, the treatment time is 0.5 through 5 hours. In cases where cocoon filaments, raw silk yarn, or silk yarn has yarn fabrics large in diameter or has sericin adhesion found therewith or in cases where the strength cannot be readily decreased such as in the case of wild silk yarns, two or three more hours need to be added or the concentration of the alkaline substance needs to be increased.

A specific time required for alkali treatment can be determined by examining the relationship between the easiness of comminution of the silk substance whose strength has been reduced through the alkali treatment, the time for the contact with the alkali, and the temperature.

What is important in reducing the strength of the silk yarn through the alkali treatment is to allow the strength of the silk yarn to decrease uniformly.

In this case, what is particularly essential is that if the silk substance to be subjected to the alkali treatment is well separated down to cocoon filaments or silk yarn, powder below 3 μm in an average particle diameter may be obtained even with boiling (at the atmospheric temperature) at an alkali treatment temperature of around 100° C., however, this will result in a variation in strength and lead to a prolonged time in alkali treatment, requiring a greater amount of alkaline substance and thus providing a significantly reduced ratio of collection.

Therefore, it is important to reduce variations in strength after the alkali treatment which depend on the portion of the silk substance such as cocoon filaments and silk yarn.

The present invention overcomes such a problem by performing the alkali treatment under a pressure above the atmospheric pressure.

A pressure above the atmospheric pressure can be obtained by putting the silk substance, an alkali substance, and water into a sealed container and then by increasing the temperature thereof to a temperature greater than the boiling temperature. The pressure ranges substantially from 1 through 5 atmospheric pressure. A pressure ranging from 1 through 3 atmospheric pressure may be preferably employed in practice particularly in industrial production.

For example, the alkali treatment for the silk substance would be carried out more uniformly under a pressure of 0.01 atmospheric pressure added to the atmospheric pressure than under the atmospheric pressure and provide a finer average particle diameter. However, it is far more effective to preferably carry out the alkali treatment under more than 0.1 atmospheric pressure added to the atmospheric pressure and, more preferably, under around two atmosphere pressure, at a temperature of 120° C.±10° C.

The silk substance after having been subjected to the alkali treatment is separated from the alkaline aqueous solution, thereafter alkaline substances adhered thereto are removed by washing in water to be dealkalized, and then the silk substance is dried.

Neutralization with acids such as hydrochloric acid or tartaric acid can be employed for dealkalization, and are effective for dealkalization and appropriate for skin.

Moreover, addition of natural acids (such as a liquid squeezed out of a citrus, for example, lemon) after neutralization and washing in water allows the silk substance to effectively fit to skin and thus makes the substance more suitable for a powder raw material for use in cosmetics.

Drying is preferably carried out using a dryer for positive drying, however, natural drying should also be possible.

The superfine powdering of the silk substance is carried out by means of combining impact comminution (coarse comminution and superfine comminution) with frictional comminution.

For example, any of the multi-stage comminuting methods in a) through c) below are employed.

a) impact comminution (coarse comminution)→frictional comminution→impact comminution (superfine comminution)→(particle size classification)

b) frictional comminution→impact comminution (coarse comminution)→impact comminution (superfine comminution)→(particle size classification)

c) frictional comminution→impact comminution (coarse comminution)→frictional comminution→impact comminution (superfine comminution)→(particle size classification)

Particles are preferably comminuted into 4 through 15 $\mu$m in an average particle diameter before the last impact comminution (superfine comminution) is carried out.

Within this range of particle diameter, the impact comminution (superfine comminution) is carried out with great efficiency.

At a result, crystalline silk superfine comminuted particles below 3 $\mu$m in an average particle diameter are obtained by the superfine comminution.

In particular, powder below approximately 1 $\mu$m or less can be obtained by the classification of particle sizes of the resultant silk superfine comminuted particles.

The resultant silk superfine comminuted particles provide an excellent sense of touch and are ready for forming.

In particular, powder having a diameter of around 1 $\mu$m provides significantly-improved adhesion to skin and extensibility and serves as a skin protective material including raw materials for cosmetics and resin composites. In cases where the material silk substance is brought into contact with the alkali aqueous solution to be treated under a pressure at a temperature of 100° C. through 150° C., the treatment is carried out by soaking the silk substance into an alkaline aqueous solution in a glass container or in a pressure-resistant metallic container made of stainless steel.

At this time, in order to reduce the strength of the material silk substance uniformly, fiber-shaped silk substances such as cocoon filaments, raw silk, or silk yarn are preferably separated as much as possible.

Dealkalization after the alkali treatment is carried out by means of repeating washing and dehydrating for neutralization or by the neutralization with acids such as hydrochloric acid or tartaric acid, and thereafter washing is repeated through washing in water and a dehydration process.

In the dehydration process, a cloth-shaped filter, for example, a filter with mesh so fine as to collect fine silk particles around 0.5 $\mu$m in a particle diameter is used.

In the alkali treatment process, non-crystalline portions of the material silk substance dissolve gradually into the alkali aqueous solution and the dissolved silk substance is removed by water at the time of dehydration. Accordingly, the silk substance to be comminuted is comprised of a crystalline silk substance in which the structure provided intrinsically for silk yarn remains (a $\beta$-type with fibroin molecules uniaxially oriented).

In the alkali treatment under a pressure according to the present invention, the amount of an alkaline substance required is much less than that required in the case of the aforementioned U.S. Pat. No. 2,615,440 in which the alkali treatment is carried out under a normal pressure. For example, the ratio of silk to carbonic acid soda must be 1:1 in the case of U.S. Pat. No. 2,615,440, while the ratio of silk to carbonic acid soda is only 1:0.5 in the case of the present invention in which the alkali treatment is carried out under a pressure at a temperature of 120° C.

This means that an improved effect is provided, in industrial production of crystalline superfine silk powder, whereby the number of times of washing in water and dehydration after the alkali treatment and the amount of acid required can be naturally reduced.

According to the present invention, silk fibroin superfine powder below 3 $\mu$m in an average particle diameter can be manufactured from a silk substance inexpensively with efficiency.

The silk fibroin superfine powder obtained by the present invention is crystalline and has a crystalline form of a $\beta$-type with fibroin molecules uniaxially oriented in the same manner as the silk yarn as described above. The powder is insoluble in water and has advantageous properties equivalent to those of silk yarn in hygroscopic property, desorptive property, moisture permeability, etc.

In particular, the powder is readily formable because of fine particles thereof, providing an improved adhesion and extensibility to the skin, and providing an extremely improved sense of touch, etc. The powder is therefore very useful for applications of raw materials for cosmetics such as lip sticks, eyebrow paints, hair dyes, eyeliners, powder blushes, and foundations, and for applications to ink additives, resin composite raw materials, and raw materials for paints.

BEST MODE FOR CARRYING OUT THE INVENTION

EXAMPLE 1

A wild silkworm (Eri silkworm, *Philosamia cynthia ricini*) cocoon shell is boiled in a 0.5% sodium carbonate aqueous solution (bath ratio of 50 times) to remove sericin, and is then washed in water and dried to form wild silkworm silk yarn.

This silk yarn (fibroin fibers) with the composition shown in Table 1 is put into a stainless steel container and is treated at a temperature of 120° C. (under a pressure of 2.02 atmospheres) with the container tightly sealed.

Sodium hydrosulfite is a bleaching agent and Clewat is a trade name of a sequestering agent for metals (made by The Teikoku Chemical Industry Co., Ltd.).

These agents exert an effect on the whiteness of wild silkworm yarn after the alkali treatment, which are required depending on the material of the container used and do not particularly exert an effect on the powdering when using the agents.

The amount of sodium carbonate and the time of alkali treatment exert an effect on the powdering.

In the case of Table 1, the strength of the silk substance was reduced to around 0.01 g/d.

The alkali treatment method is shown in Table 1.

TABLE 1

| Eri silk yarn | 20 (g) |
| Sodium carbonate | 8 (g) |
| Sequestering agent (Clewat) | 5 (g) |
| Sodium hydrosulfite | 1 (g) |
| Water | 600 (g) |

The tensile strength was measured by means of a Tensilon UTM-II.

An alkali solution containing alkali-treated wild silkworm silk yarn was reduced to 8.5 in pH with hydrochloric acid, then neutralized with tartaric acid, then put into a bag-shaped container of woven fabrics with a high degree of mesh, repeatedly washed in water and dehydrated four times, and then dried at around 40° C.

In the comminuting treatment, an agitating crusher (a type by Ishikawa) was used for frictional comminution and then a rotary impact pulverizer (Sample Mill KI-1 made by Fuji Denki Kogyo) was used for powdering to obtain fine silk powder around 12 μm in an average particle diameter.

Moreover, this fine powder is crushed by means of an air-jet pulverizer (Current Jet CJ-10 made by Nisshin Flour Milling Co., Ltd.) and thereafter classified by means of a classifier (Turbo classifier TC-16N made by Nisshin Flour Milling Co., Ltd.). Thus, superfine powder was obtained which has average particle diameters of around 2.6 μm and 0.9 μm (FIG. 1).

Figure 1:
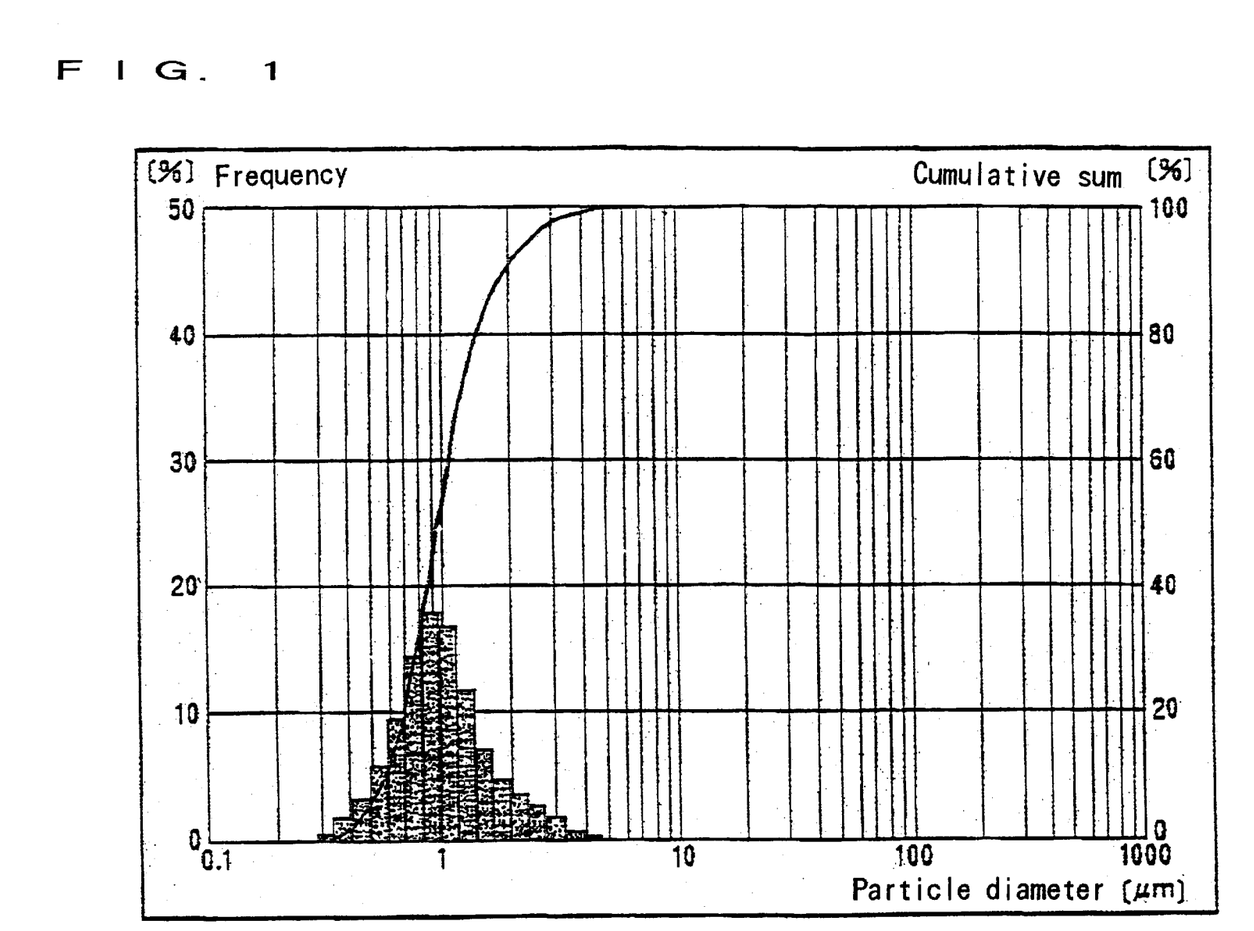
FIG. 1 is a view showing a distribution of particle sizes of superfine powder 0.9 $\mu$m in an average particle diameter in the examples.

As can be seen clearly in FIG. 1, particles of 5 μm or more in diameter are contained among particles around 1 μm or less in an average particle diameter that are obtained through the frictional comminution and classification processes.

This superfine powder can be combined into fabrics around 10 μm in the diameter of fiber to improve the property of the fabrics.

COMPARATIVE EXAMPLE 1

A wild silkworm (Eri silkworm) cocoon shell is boiled in a 0.5% sodium carbonate aqueous solution (bath ratio of 50 times) to remove sericin, and is then washed in water and dried to form wild silkworm silk yarn. This silk yarn (fibroin fibers) with the composition shown in Table 2 is then put into a stainless steel container and then boiled at a normal pressure.

TABLE 2

| Silk yarn (Bombyx mori) | 20 (g) |
| Sodium carbonate | 8 (g) |
| Sequestering agent (Clewat) | 5 (g) |
| Sodium hydrosulfite | 1 (g) |
| Water | 600 (g) |

The strength of the resultant silk substance was reduced to only 0.06 g/d.

The solution containing alkali-treated wild silkworm silk yarn was neutralized with hydrochloric acid, and then the silk yarn is put into a bag-shaped container of woven fabrics with a high density, repeatedly washed in water and dehydrated four times, and then dried at around 40° C.

For comminuting treatment, an agitating crusher (a type by Ishikawa) was used for frictional comminution and then a rotary impact pulverizer (Sample Mill KI-1 made by Fuji Denki Kogyo) was used for powdering. Thereafter, this fine powder is crushed by means of an air-jet pulverizer (Current Jet CJ-10 made by Nisshin Flour Milling Co., Ltd.). Finally, particles had an average particle diameter of 5.7 μm.

COMPARATIVE EXAMPLE 2

A crystalline superfine silk powder was observed by means of a polarizing microscope.

The object of the present invention is to allow the structure provided intrinsically in silk to remain in the crystalline superfine silk powder. The structure of silk yarn is apt to be destroyed in the mechanical comminution of silk yarn, however, the silk powder particles having a structure provided intrinsically in silk indicates birefringence like silk yarn. Observation of the particles under a polarizing microscope using an inspection plate shows particles in yellow or blue. In contrast, a non-crystalline powder that is crystallized with alcohol shows no birefringence.

Appearance of birefringence in the non-crystalline powder did not show such a high value as that of silk yarn, so that observation by a combination of the shape of particles and birefringence substantially shows whether the structure provided intrinsically in silk remains in the powder. Accordingly, the crystalline superfine silk powder, according to the present invention, was observed under a polarizing microscope using an inspection plate. As a result, the observation showed the same birefringence in 90% or more of particles 1.2 μm in an average particle diameter as that found in silk yarn.

On the other hand, silk powder was manufactured by the method for silk fibroin superfine powder described in Japanese Laid-Open Patent Publication No. Hei 6-339924.

As a result, the average particle diameter was 5.2 μm.

Observation of this silk powder under the polarizing microscope showed the same birefringence as that found in silk in 60 through 70% of the particles.

The present invention allows the structure provided intrinsically in silk to remain in the particles up to 1 μm in particle diameter.

EXAMPLE 2

As a material substance, bourette (by-silk-yarn a few centimeters or less in the fiber length of silk yarn, *Bombyx mori*) was used which comes out in a silk spinning process and the bourette having the composition shown in Table 3 was put into a glass bottle to be treated for two hours at a temperature of 125° C. (under a pressure of 2.37 atmospheres) with the bottle tightly sealed.

TABLE 3

| | |
|---|---|
| Silk yarn (Bombyx mori) | 20 (g) |
| Sodium carbonate | 4.5 (g) |
| Sequestering agent (Clewat) | 4 (g) |
| Sodium hydrosulfite | 2 (g) |
| Water | 400 (g) |

The treated silk substance was neutralized, washed in water, and dried, and thereafter comminuted.

The substance was neutralized with hydrochloric acid to have a pH of 7±1, and then dehydrated and washed in water repeatedly four times, and finally dried at a temperature of 40° C.

The comminuting treatment was carried out by means of the same agitating crusher used in Example 1.

That is, in the comminuting, the agitating crusher (a type by Ishikawa) was used for frictional comminution; then the rotary impact pulverizer (Sample Mill KI-1 made by Fuji Denki Kogyo) was used for powdering; and then the agitating crusher (a type by Ishikawa) was used again for frictional comminution to obtain fine silk powder of around 11 μm in an average particle diameter.

This fine powder was crushed by means of an air-jet pulverizer (Current Jet CJ-10 made by Nisshin Flour Milling Co., Ltd.) to obtain powder of around 2.0 μm in an average particle diameter after the air-jet comminuting treatment.

The powder was classified thereafter to obtain crystalline superfine silk powder which have average particle diameters of around 2.5 μm and 0.9 μm.

Figure 2:
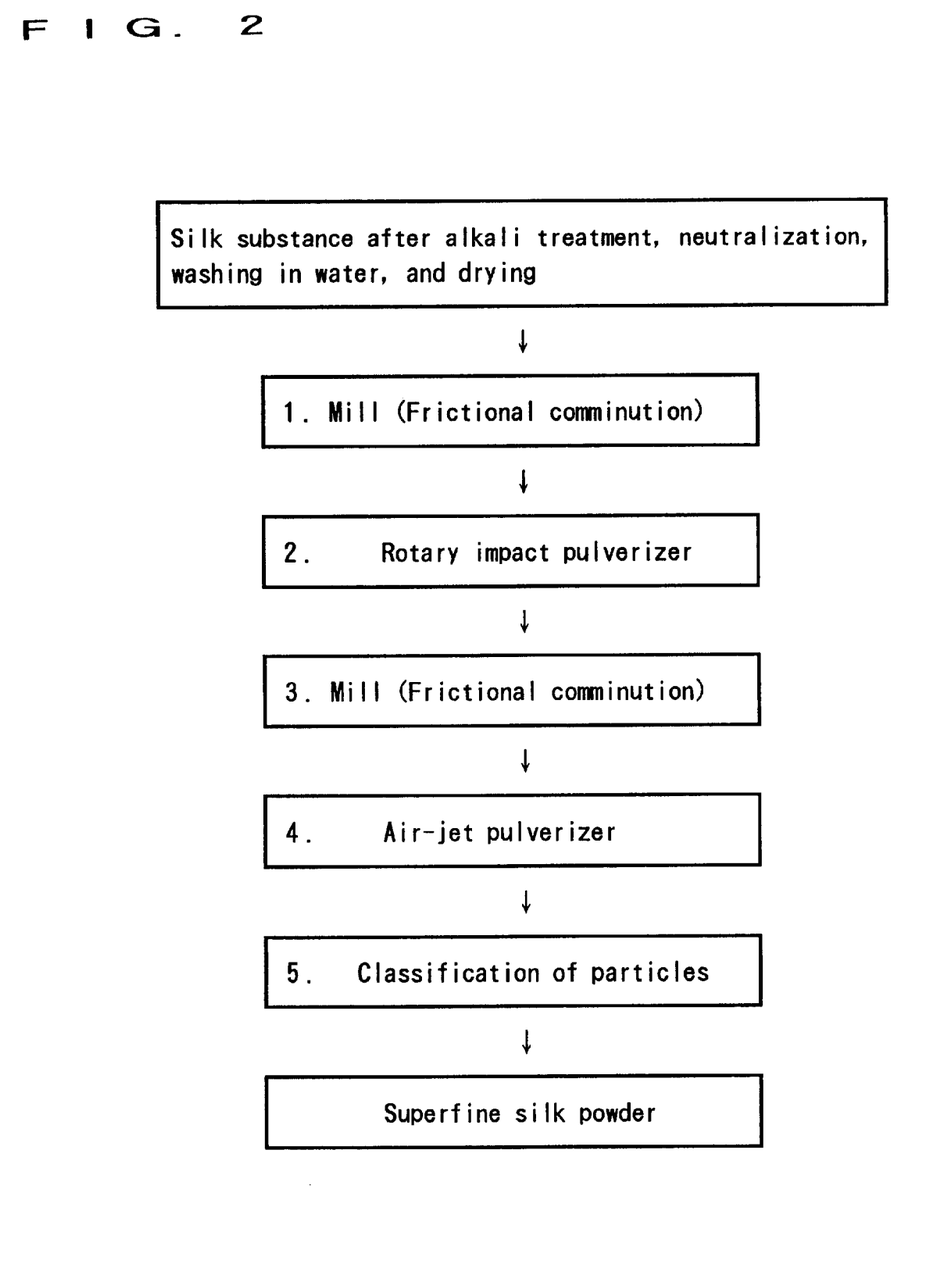
FIG. 2 is a flow diagram showing a comminuting process after an alkali treatment.

FIG. 2 shows the comminuting process by a flow diagram.

EXAMPLE 3

Raw silk of silkworms, Bombyx mori, was boiled for one hour for degumming in a 0.1% sodium carbonate aqueous solution 50 times greater in quantity than the raw silk to form fibroin fabrics (silk yarn).

This silk yarn was used as a material substance to perform alkali treatment under conditions shown in Table 4.

Figure 3:
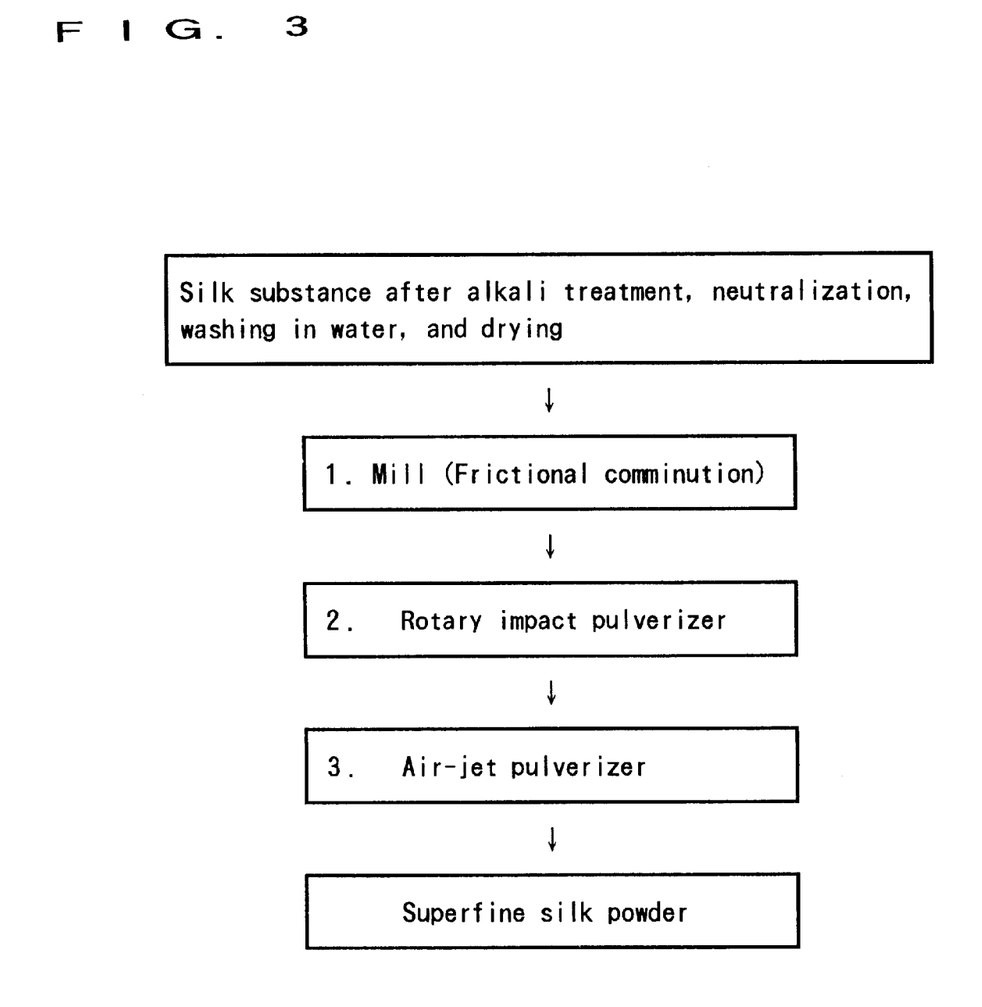
FIG. 3 is a flow diagram showing a comminuting process after an alkali treatment.
Figure 4:
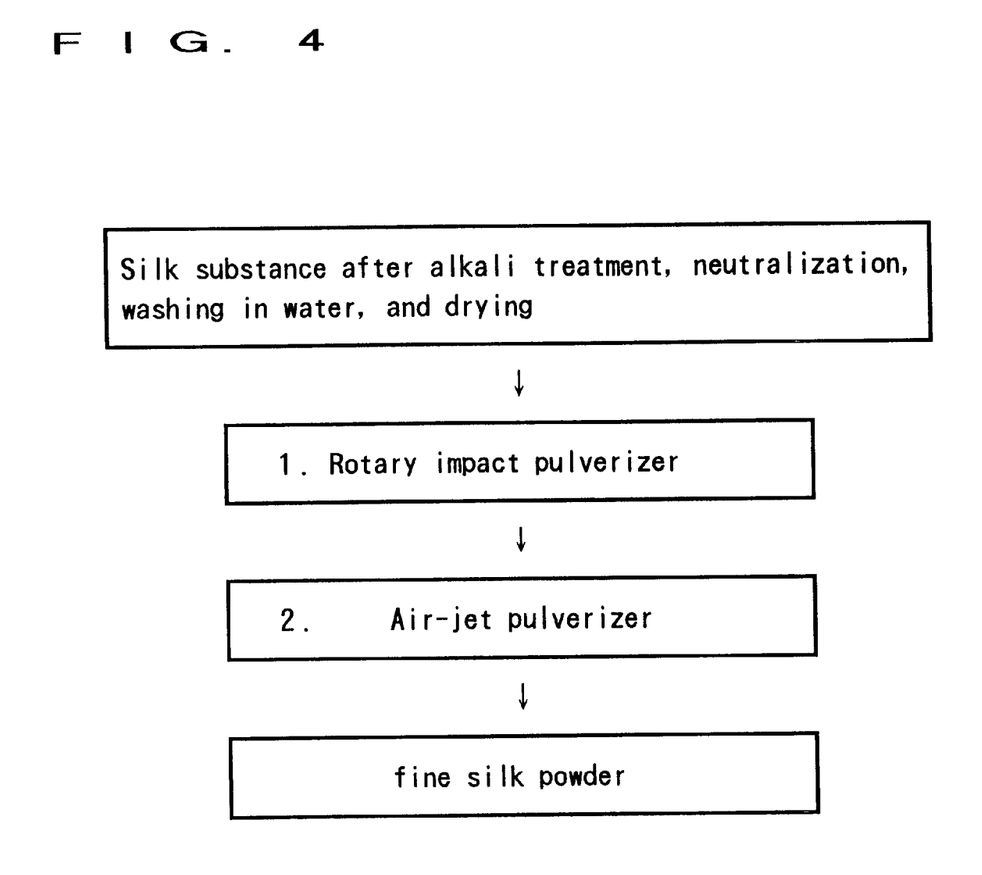
FIG. 4 is a flow diagram showing a comminuting process after an alkali treatment.

For the comminuting process after the alkali treatment, case (1), case (2), and case (3) of Table 4 were carried out like in the processes shown in FIG. 2 excluding the classifying process; case (4) of Table 4 was carried out as in the process shown in FIG. 3; and case (5) of Table 4 as in the process shown in FIG. 4.

FIG. 3 and FIG. 4 show flow diagrams of the comminuting process.

Table 4 shows the average particle diameter of the resultant powder and the ratio of collection of powder.

In addition, classification of the resultant powder obtained in case (3) of Table 4 provided powder 1.2 μm and 2.5 μm in an average particle diameter.

TABLE 4

| Condition | (1) | (2) | (3) | (4) | (5) |
|---|---|---|---|---|---|
| Treatment temperature (° C.) | 100 | 110 | 120 | 120 | 120 |
| Atmospheric pressure (atm) | 1.03 | 1.46 | 2.02 | 2.02 | 2.02 |
| Treatment time (h) | 8 | 5 | 2.5 | 2.5 | 2.5 |
| Sodium carbonate (g) | 20 | 10 | 4 | 4 | 4 |
| Silk yarn, Bombyx mori (g) | 20 | 20 | 20 | 20 | 20 |
| Sodium hydrosulfite (g) | 1 | 1 | 1 | 1 | 1 |
| Water (g) | 500 | 500 | 500 | 500 | 500 |
| Average particle diameter (μm) | 2.8 | 2.1 | 1.8 | 2.3 | 3.2 |
| Ratio of collection of powder (%) | 50 | 55 | 60 | 60 | 60 |

EXAMPLE 4

Table 5 shows the relationship between the average particle diameter of the silk powder particles and the adhesion property thereof, concerning the silk powder of silkworms, Bombyx mori, which was obtained by the methods of Examples 2 and 3, and in the intermittent processes thereof.

An amount of around 10 g of silk powder with different average particle diameters is placed on a sheet of paper and is spread to about 50 $cm^2$. Then, a test piece is placed on the powder to be adhered thereto and further, the test piece was covered with an amount of 10 g of the powder of the same average particle diameters.

Subsequently, the test piece buried in the powder was lifted vertically with tweezers. Then, the test piece was weighed with powder adhered thereto to calculate the amount of powder adhered to the surface and the reverse of the test piece per unit area.

The measurement was carried out in a room at a temperature of 20° C. with 65% HR.

The test piece had the shape of a film with a side thereof having an area of around 10 $cm^2$ (10 $cm^2$±0.5 $cm^2$).

Three types of materials of metal (aluminum), resin (polyethylene), and natural substance (silk fibroin) were used in the test piece.

As can be seen clearly in Table 5, over a range of average particle diameters around 3 μm or less, the smaller the particles diameter, the larger the amount of powder adhered to the test piece becomes in any material.

TABLE 5

Relationship between average particle diameter and adhesion property of silk powder particles

| Average particle diameter (μm) | Amount of powder adhered to the test piece (mg/cm$^2$) | | |
|---|---|---|---|
| | Silk fibroin | Polyethylene | Aluminum |
| 0.9 | 3.003 | 0.863 | 1.418 |
| 1.21 | 2.887 | 0.761 | 1.233 |
| 2.32 | 1.390 | 0.589 | 1.045 |
| 2.57 | 1.148 | 0.520 | 0.904 |
| 3.65 | 0.613 | 0.311 | 0.566 |
| 5.40 | 0.452 | 0.297 | 0.491 |
| 12.20 | 0.304 | 0.206 | 0.281 |

EXAMPLE 6

Using silk powder obtained by the methods of Examples 1 through 3, the sense of touch thereof was evaluated in a panel experiment by five women.

The test was carried out in a room of constant temperature and constant humidity at 20° C. with 65% RH. An amount of 1 g of silk powder was placed on the inside of the forearm of one arm and was pressed with the other hand to be rubbed in various directions. The subjects were asked to fill in a questionnaire of how they felt at that time. The results are shown in Table 6.

As shown in Table 6, it can be seen that improved adhesion to the skin, extensibility, and smoothness are provided by the silk powder below around 3 μm in an average particle diameter, particularly by that below 1μm in diameter.

TABLE 6

| Particle diameter (μm) | Sense of touch |
|---|---|
| 12 | Rough feeling |
| 8 | Not rough to touch |
| 5 | Soft to touch |
| 3.7 | Soft to touch |
| 2.3 | Very soft to touch, good in adhesion to the skin, and good in extensibility on the skin |
| 0.9 | Very soft to touch, very good in adhesion to the skin, and very good in extensibility on the skin |

EXAMPLE 7

In order to examine the formability of powders such as Talc (JA-46R), Mica (No.5500), Titan (A-100), and Kaolin (JP-100), rupture tests were conducted on supported beams with the powders employed as raw materials.

In the tests, as shown in FIG. 4, a beam was supported at an interval of 4 cm and loaded at point A. A magnitude of the load provided at the time of rupture was measured with Tensilon UTM-II.

The silk powder used was the same as that shown in Table 4 in Example 4. An amount of 4.0 g of each of the powders was put into a mold of 10 mm (W)×100 mm (L)×30 mm (H) and subjected to a load of 30 kg/cm² to be formed.

The results are shown in Table 7.

Concerning powders for cosmetics such as Talc, Mica, Titan, and Kaolin, these powders (4.0 g) were put into a mold with 10 mm (W)×100 mm (L)×30 mm (H) and subjected to a load of 30 kg/cm² to be formed.

However, these formed powders were ruptured with a load around 1 g or less. The formed shapes were hardly sustained and thus the formability of the powders were too inferior to conduct measurement of rupture strength by such a method.

Figure 5:
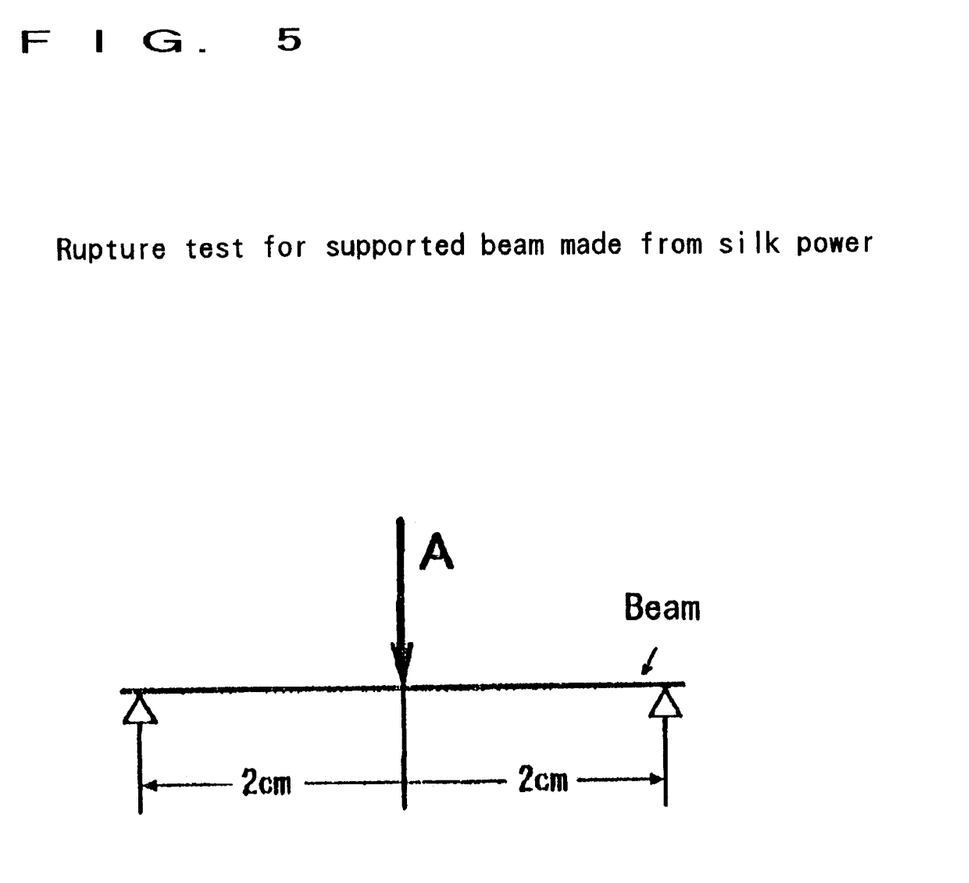
FIG. 5 is a view showing a rupture test of a supported beam employing powder as a raw material.

In order to prevent rupture caused by impacts to cosmetics in the form of powder, in the rupture test shown in FIG. 5, the powder requires strength of around 20 g and preferably 30 g or more in strength. Accordingly, an amount of a 4.0 g mixture of 50 wt % of the aforementioned silk powder 1.21 μm in an average particle diameter and 50 wt % of Talc (JA-46R) was put into a mold of 10 mm (W)×100 mm (L)×30 mm (H) and subjected to a load of 30 kg/cm² to be formed like the foregoing. Then, the rupture load was measured to be 31.2 g. The silk powder can be used as a molding material.

TABLE 7

| Average particle diameter (μm) | 0.9 | 1.21 | 2.32 | 2.57 | 3.65 | 5.40 | 12.20 |
|---|---|---|---|---|---|---|---|
| Rupture load (g) | 53.8 | 63.5 | 36.3 | 44.8 | 21.6 | 12.2 | 4.3 |

Industrial Applicability

The crystalline superfine silk powder manufactured according to the present invention is excellent in applications to raw materials for use in cosmetics such as lip sticks, eyebrow paints, hair dyes, eyeliners, powder blushes, and foundations, and in applications to ink additives, resin composite raw materials, and raw materials for paints.

What is claimed is:

1. A method for manufacturing crystalline silk fibroin powder below 3 μm in average particle diameter comprising the steps of:

bringing a silk substance into contact with an alkali aqueous solution under a pressure exceeding 1 but no more than 5 atmospheric pressures and at a temperature exceeding 100° C. but no more than 150° C. to reduce the tensile strength of the silk substance to around 0.02 g/d or less, dealkalizing and drying the resultant silk substance after that, and comminuting the dried resultant silk substance thereafter.

2. The method for manufacturing crystalline silk fibroin powder below 3 μm in average particle diameter according to claim 1, wherein said alkali aqueous solution has a pH of 9 through 12.5.

3. The method for manufacturing crystalline silk fibroin powder below 3 μm in average particle diameter according to claim 1, wherein impact and frictional comminution are combined to comminute said dried silk substance.

4. The method for manufacturing crystalline silk fibroin powder below 3 μm in average particle diameter according to claim 1, wherein impact and frictional comminution are combined in order to comminute said dried silk substance, and further comprising the step of classifying the comminuted dried silk substance.

5. The method for manufacturing crystalline silk fibroin powder below 3 μm in average particle diameter according to claim 3, comprising the steps of:

in order to perform comminution by combining impact and frictional comminutions, first, performing impact comminution-frictional comminution, frictional-comminution-impact comminution, or frictional comminution-impact comminution-frictional comminution in sequence to produce silk powder of 4 through 15 μm in average particle diameter, and subsequently, performing impact comminution to produce superfine powder below 3 μm in average particle diameter.

* * * * *